United States Patent
Robinson

(10) Patent No.: US 8,249,958 B2
(45) Date of Patent: Aug. 21, 2012

(54) ALLERGEN-FREE FOOD EXPENSE TRACKING SYSTEM

(76) Inventor: Steven W. Robinson, Long Valley, NJ (US)

( * ) Notice: Subject to any disclaimer, the term of this patent is extended or adjusted under 35 U.S.C. 154(b) by 156 days.

(21) Appl. No.: 12/662,839

(22) Filed: May 5, 2010

(65) Prior Publication Data

US 2010/0287076 A1    Nov. 11, 2010

Related U.S. Application Data

(60) Provisional application No. 61/213,096, filed on May 6, 2009.

(51) Int. Cl.
*G07B 17/00* (2006.01)
*G07F 19/00* (2006.01)
*G06F 17/22* (2006.01)

(52) U.S. Cl. .......................................... 705/30; 705/31
(58) Field of Classification Search ................... 705/30, 705/31

See application file for complete search history.

(56) References Cited

OTHER PUBLICATIONS

Kay, Alan S. Rating the Tax Programs, Washington Post Feb. 15, 2004 retrieved from washingtonpost.com.*
Quicken, Quicken Home Page—Financial planning software online, Feb. 7, 2006 Snapshot courtesy of Internet Archive Waback Machine.*
Turbotax, Turbotax Home Page—Tax calculation software online, Apr. 7, 2006 Snapshot courtesy of Internet Archive Waback Machine.*
Adams, Scott. Tax Deduction for Gluten-Free Foods as a Medical Expense for Diagnosed Celacs Only, Celiac.com Jul. 26, 1996.*
USDA1, USDA Food Plans: Cost of Food, Sep. 23, 2006 Snapshot courtesy of Internet Archive Waback Machine.*
USDA2, USDA—Cost of Food at Home, Sep. 23, 2006 Snapshot courtesy of Internet Archive Waback Machine.*

* cited by examiner

*Primary Examiner* — Matthew Gart
*Assistant Examiner* — Michael Maicher
(74) *Attorney, Agent, or Firm* — Thomas J. Germinario

(57) ABSTRACT

A website with secure user access enables a registered user to obtain a dashboard report (YTD, or for other customized date ranges) on incremental spending relating to the user's food allergies and/or food intolerances.

2 Claims, 1 Drawing Sheet

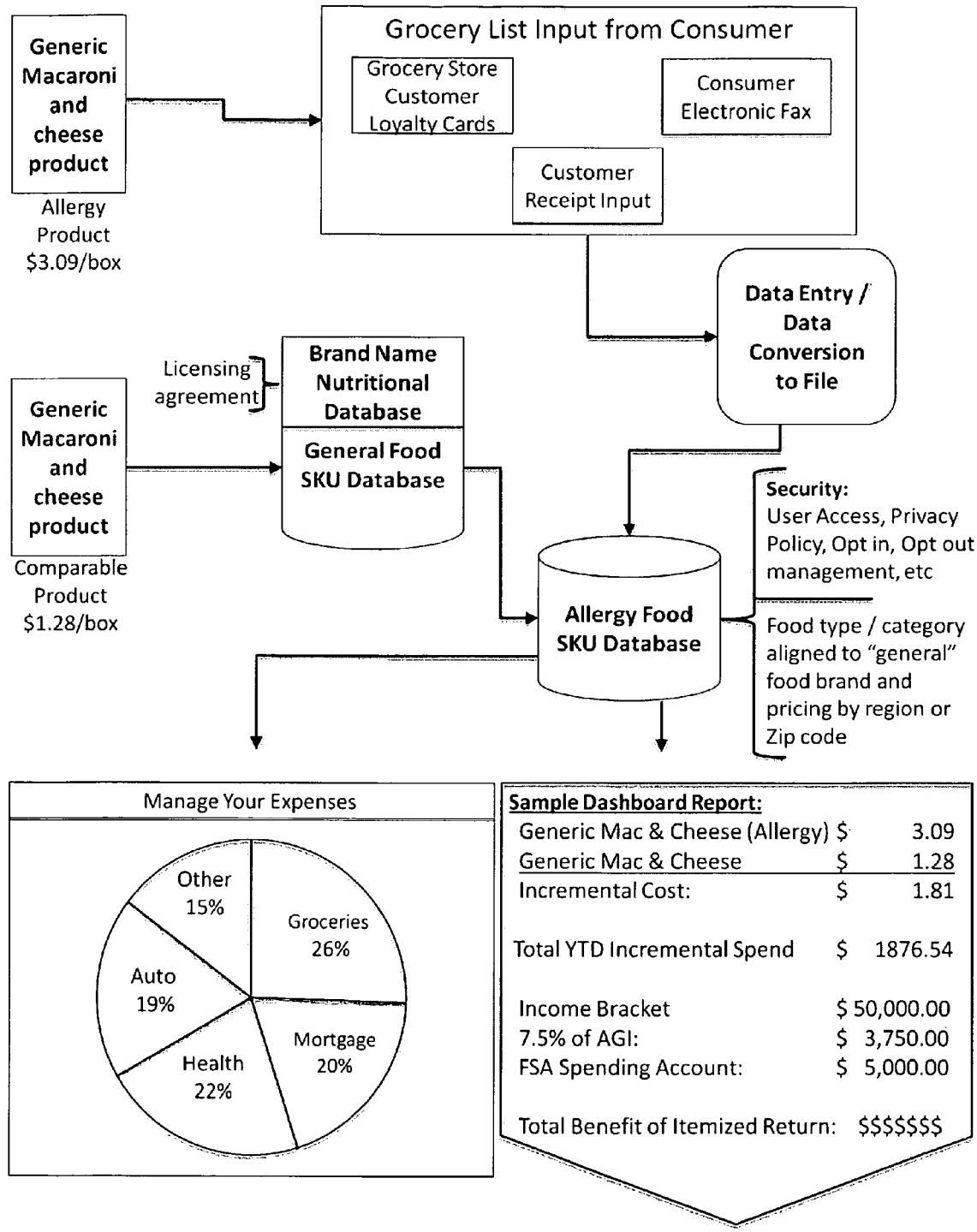

ALLERGEN-FREE FOOD EXPENSE TRACKING SYSTEM

REFERENCE TO RELATED APPLICATION

This application claims the benefit of the filing date of Provisional Application No. 61/213,096, which was filed on May 6, 2009.

BACKGROUND OF THE INVENTION

The present invention relates to online services and databases that provide information and support for groups of people who share a common problem or interest. More specifically, the present invention relates to an online service with databases that provide information and support for persons who suffer from food allergies and/or food intolerance including celiac disease.

A food allergy is an abnormal response to the consumption of food triggered by the body's immune system. The most common food allergies relate to four food groups: milk/dairy products, wheat, nuts, and fish/shellfish. Food allergies affect 2% of adults and 6-8% of children in the U.S. (6-7 million people). Food intolerance is not caused by the immune system, but has symptoms similar to those of food allergies. The most common food intolerance conditions are lactose intolerance and gluten intolerance (celiac disease). Food intolerance affects 28% of the population the United States. 30 to 50 million Americans are lactose intolerant, while 1.2 to 3 million Americans suffer from celiac disease.

Those affected by a food allergy/intolerance must follow a special diet that includes special foods that are free of ingredients to which they are sensitive. Such special foods include those that are lactose-free, gluten-free and nut-free. But these special allergen-free foods are typically more expensive than common brands that are not free of allergens.

Under the tax code, the cost of special food products and food supplements, as well as food preparation devices, such as bread ovens, or food mixers, above the cost of common foods qualify as a medical deduction when they are prescribed by a physician or other health care professional for alleviation or treatment of an illness. The IRS allows tax deductions based on the difference between the price of allergen-free and non-allergen-free products where these differences together with other uninsured medical/dental expenses exceed 7.5% of adjusted gross income (AGI). Incremental expenses associated with the purchase of allergen-free foods may also be credited against deductable limits of health insurance policies. But identifying, capturing, and calculating these incremental expenses can be too laborious, tedious and time-consuming for most people with food allergies/intolerances to pursue. In order to calculate the incremental food expense, one must not only track daily grocery expenditures in terms of allergen-free food purchases, but one must also somehow obtain the comparative cost of corresponding non-allergen-free foods that are not purchased.

Database tools that track allergen-free food purchases and calculate price differentials relative to comparable non-allergen free food products simply do not exist in the prior art. Kocher, International Pub. No. WO01/13317, teaches a method of scanning user food purchase data and utilizing a food allergy database to generate diet advisory reports based on the user's medical profile. But the Kocher method does not address incremental expenses associated with purchases of allergen-free food products. Nor does the system of Okubo, et al., Japanese Application No. JP2000/000182178, which extracts from a food database non-allergic products based on the user's input designating allergic ingredients. While these inventions are useful in selecting suitable food products based on a user's specific food allergy/intolerance, they are not helpful in capturing the incremental costs associated with the purchase of such special products.

The present invention provides a web site application comprising two databases—one database of allergen-free foods, and the other of the 'normal' food products. Based on a medical profile of food allergies and/or intolerances that the user inputs through secure access to the website, the system cross-references the two databases each time the user's grocery purchase data are entered and compares the cost of purchased allergen-free products to comparable non-allergen-free products. The incremental costs are calculated and compiled as year-to-date (YTD) tax deduction figures on a user-accessible website dashboard. The cost differentials can be also modified by region, zip code, or by store brand. At the end of the year, the user can print a report for his/her accountant showing the annual incremental expense of allergen-free foods and other food preparation devices or export the information to his/her tax preparation software.

SUMMARY OF THE INVENTION

The present invention comprises a website with secure user access wherein a registered user can obtain a dashboard report (YTD, or for other customized date ranges) on incremental spending relating to the user's food allergies and/or food intolerances. During his/her initial registration on the website, the user will be cued to enter medical profile data, including food allergies and/or intolerances. The user will also be cued to enter basic tax data, including AGI (Adjusted Gross Income), AMT (Alternative Minimum Tax), other uninsured medical/dental expenses, as well as applicable deductable limits of health insurance policies. When initial registration is completed, the user will be assigned a user name and password, by which he/she may subsequently securely sign on to his/her account on the website.

The dashboard report is generated using two databases: a general food SKU database and an allergen-free food SKU database. Products will be categorized, and pricing will be provided according to average prices by region or zip code. The users will input their food purchases by one of three methods: (a) scanning receipts to a data entry service, or data recognition system, (b) consensual access to user's grocery card database, and/or (c) manual data entry by the user him/herself or by a data entry service arranged with the website's operator. The dashboard will track the YTD incremental cost of allergen-free food purchases and compile it along with other uninsured medical/dental expenses as a percentage of AGI and insurance deductible in order to compute the allowable tax/insurance deductions. The dashboard will also allow customized reports for the user to see total purchases by product, brand, store or e-commerce web site, region, food category or type, and different date ranges. The dashboard will provide links to accounting/tax preparation software and/or websites so that the user can export data from the dashboard reports. The dashboard and website will also provide other educational information, or links to other related web sites. The dashboard and website will also provide links to "preferred" or relevant e-commerce web sites where allergy-free food products can be purchased. Price comparison will also be available.

Having described the general concepts of the present invention, it is understood that the invention may be realized in a number of possible embodiments. While one of these embodiments has been selected to illustrate in more concrete form how this invention may be practiced, it is understood that the following detailed description is presented for exemplary purposes only and does not limit the scope of the present invention or the claims made in relation thereto.

BRIEF DESCRIPTION OF THE DRAWING

FIG. 1 is a process flow chart of an exemplary allergen-free food expense tracking system according to the preferred embodiment of the present invention.

DETAILED DESCRIPTION OF THE PREFERRED EMBODIMENT

FIG. 1 illustrates how the allergen-free food expense tracking system works in the case of a registered user who suffers from celiac disease (gluten intolerance). In his initial registration on the website, the user has provided input as to his gluten intolerance as well as his income bracket. Upon purchasing a gluten-free product, exemplified in the drawing by a box of "Aunt Annie's Mac & Cheese", the product and price data are input either through access to the user's grocery card accord, or via a receipt scanner, or via fax with subsequent manual data entry by the website operator's data entry service, or by the user's own manual data entry.

For each data entry for a gluten-free food product purchase, the system cross-references a comparable non-gluten-free product. In the exemplary rendering of FIG. 1, the comparable product is "Kraft Mac & Cheese". The system then computes the difference between the price of the gluten-free product, in this example $3.09, and the price of the comparable regular product, in this case $1.28, and computes the gluten-free price increment, which is $1.81 in the illustrated example.

A running YTD incremental spending total is compiled and displayed on the user's dashboard, and the same figures can be exported to the user's tax software and/or tax website. Based on the user's AGI and/or AMT, as well as his other non-reimbursed medical/dental expenses the dashboard also displays the user's threshold figure for a medical tax deduction, which in this case is $3,750.

Although the preferred embodiment of the present invention has been disclosed for illustrative purposes, those skilled in the art will appreciate that many additions, modifications and substitutions are possible, without departing from the scope and spirit of the present invention.

What is claimed is:

1. An internet-based system that enables a user to use a website to track incremental expenses related to the purchase of allergen-flee food products as compared to equivalent non-allergen-flee food products, the system comprising:
    (a) a first database of allergen-flee food products, wherein the allergen-flee food products are categorized and identified by applicable product identification or stock-keeping codes, and wherein average pricing associated with each allergen-flee food products is compiled by geographic area;
    (b) a second database of non-allergen food products, wherein the non-allergen-free food products are categorized and identified by applicable product identification or stock-keeping codes, and wherein average prices associated with each non-allergen-flee food product is compiled by geographic areas;
    (c) a comparative database software program, which matches each allergen-free food product in the first database with an equivalent non-allergen-flee food product in the second database;
    (d) a user registration interface, whereby the user can register to become a registered user on the website and can enter personal data, including the user's geographic area, the user's medical data with respect to food allergies or intolerances, the user's tax information, and the user's medical insurance information;
    (e) a user data interface, whereby the registered user can input to the website data regarding purchased items of allergen-free food products and corresponding item prices paid for the allergen-free food products;
    (f) a computational software program running on a processor, whereby the average prices of equivalent non-allergen-free food products are subtracted from the item prices of the purchased items of allergen-free food products to obtain incremental food expenses, and whereby the incremental food expenses are continually totaled and compiled as a total incremental food expenditure on a year-to-date (YTD) basis or for another selected range of dates; and
    (g) a user-accessible internet-based dashboard program that displays dashboard information regarding incremental food expenses, total incremental food expenditure, tax deductions, and/or insurance deductibles.

2. The system according to claim 1, wherein the dashboard program exports the dashboard information to the registered user's tax preparation software or to a tax preparation website.

\* \* \* \* \*